United States Patent [19]

Villa et al.

[11] Patent Number: 4,675,196

[45] Date of Patent: Jun. 23, 1987

[54] PROCESS FOR THE TOTAL OR PARTIAL ELIMINATION OF ASPARTIC ACID AND GLUTAMIC ACID FROM PROTEIN HYDROLYZATES AND MIXTURES OF AMINOACIDS, AND AMINOACID COMPOSITIONS THEREFROM

[75] Inventors: Carlo Villa; Alvise P. G. Vecchiolino; Alberto Mangia, all of Milan, Italy

[73] Assignee: Pierral S.p.A., Naples, Italy

[21] Appl. No.: 584,520

[22] Filed: Feb. 28, 1984

Related U.S. Application Data

[62] Division of Ser. No. 387,792, Jun. 14, 1982, abandoned.

[30] Foreign Application Priority Data

Jun. 23, 1981 [IT] Italy ............................. 22514 A/81

[51] Int. Cl.$^4$ ........................... A23C 9/14; C12H 1/04; C07C 99/12; C07C 101/22
[52] U.S. Cl. .................................... 426/271; 426/656; 514/2; 514/893; 514/921; 562/553; 562/554; 562/573
[58] Field of Search ................ 426/271, 656; 562/553, 562/554, 573

[56] References Cited

U.S. PATENT DOCUMENTS

| 3,015,655 | 1/1962 | Stark | 562/554 |
| 3,045,026 | 7/1962 | Eisenbraun | 562/573 |
| 3,686,118 | 8/1972 | Benson | 562/554 |
| 4,006,032 | 2/1977 | Hills | 426/271 |
| 4,229,342 | 10/1980 | Mirabel | 426/271 |
| 4,395,429 | 7/1983 | Campagne et al. | 426/271 |
| 4,514,427 | 4/1985 | Mitchell et al. | 426/271 |
| 4,522,836 | 6/1985 | Dechow et al. | 426/271 |

FOREIGN PATENT DOCUMENTS 39-22830 10/1964 Japan ................................. 562/573

Primary Examiner—Ronald W. Griffin
Attorney, Agent, or Firm—Bucknam and Archer

[57] ABSTRACT

A process for the total or partial elimination of aspartic acid and glutamic acid from a protein hydrolyzate or a mixture of aminoacids is described, which consists of passing the hydrolyzate or mixture of aminoacids in solution on an anion exchange resin and then washing with water or eluting the aminoacids from the resin. Aspartic acid and glutamic acid are at least partially separated from the other aminoacids because of their affinity for the resin which is greater than the affinity of the other aminoacids. The resulting mixtures of aminoacids may be used as such or may be further adjusted by addition of valine, leucine, isoleucine, and arginine to give products valuable in clinical nutrition.

12 Claims, No Drawings

PROCESS FOR THE TOTAL OR PARTIAL ELIMINATION OF ASPARTIC ACID AND GLUTAMIC ACID FROM PROTEIN HYDROLYZATES AND MIXTURES OF AMINOACIDS, AND AMINOACID COMPOSITIONS THEREFROM

This is a division of application Ser. No. 387,792 filed June 14, 1982, now abandoned.

The present invention relates to protein hydrolysates and more specifically to a novel, inexpensive and readily accessible industrial process for the preparation of products from protein hydrolysates or from mixtures of aminoacids, which are derived from several processes, (chemical hydrolysis, enzymatic hydrolysis, fermentation, etc.), which products are useful for a variety of applications such as pharmaceuticals and particularly for parenteral, oral and enteral nutrition, veterinary, zootechnical and industrial nutrition, which products are completely free of both aspartic acid and glutamic acid or with a content of these two aminoacids lower than the amount present in the initial materials so as to satisfy the requirements of the applications for which the products are to be used.

The requirement of eliminating both aspartic acid and glutamic acid from the protein hydrolysates or from the mixtures of aminoacids or reducing their content, is particularly important in the pharmaceutical field and above all, in the case of parenteral and enteral feeding of the patient in conditions after an operation and in all instances in which a catabolic state or a state of malnutrition is present, conditions which make it necessary to administer nitrogen in the form of substances which are easily assimilated.

Some investigators have attributed to aspartic acid and glutamic acid and phenomena of nausea and vomiting which have occured in the case of patients to whom the protein hydrolysates had been administered by the endovenous route, (Levey, S., Marroun, J. E. and Smyth, C. J., J. Lab., Clin. Med., 34, 1238–1249 (1949); Mayer-Gross, W. and Walker, J. W., Biochem. J., 44, 92–97 (1949)).

More recent studies have shown brain damage to newborns of some animal species after oral and parenteral administration of aspartic acid and glutamic acid, (J. W. Olney and O. L. Ho, Nature 227, (1970) 609–611; J. W. Olney, J. Neurophatol. Exp. Neurol., 30 (1971) 75–90; R. M. Burde, B. Schainker and J. Kayes, Nature 233, 58–60 (1971); L. D. Stegink, J. Tox. and Envir. Health, 2, 215 (1976); V. J. Perez and J. W. Olney, J. Neurochem. 19, 1777 (1972). Studies carried out by J. E. Fischer and co-workers have also shown high plasma levels of aspartic acid and glutamic acid in patients affected by serious hepatic changes, (Surgery, 80, 77–91 (1976); J.A.M.A. 242, 347–349 (1979)).

An increasing number of aminoacid solutions for parenteral use on the market in Europe, in the United States, and Japan has continued to conform to the scientific requirements mentioned hereinabove, particularly with respect to liver pathology and neonatology. For the preparation of these solutions, there are utilized individual aminoacids obtained by the processes of fermentation, enzymatic, synthetic and by extraction, in appropriate amounts. It is clear that when solution of aminoacids are formulated for infusion, starting from crystalline aminoacids, it is possible to select both the type of aminoacids, as well as their respective molar ratio.

More frequently there are found formulations, which comply with the scientific requirements only partially, because in other respects they comply with economic requirements in view of the continuous increase of the cost of crystalline aminoacids. Thus, there is always a tendency to increase the content of aminoacids which are inexpensive such as glycine and which have a high proportion of nitrogen, such as glycine and alanine in order to increase the total nitrogen being administered in the solution.

However, if one uses proteins of natural origin, both animal as well as vegetable origin, the type of aminoacid and the molar ratio of the individual aminoacid is predetermined. From these proteins, it is possible to obtain with a process of chemical hydrolysis according to Italian Pat. No. 904,830, a mixture of aminoacids, which after several publications in accordance with Italian Pat. No. 942,580, exhibits a very high degree of purity. At the end of this process, a mixture of aminoacids is obtained, which corresponds to the composition of the protein starting material, except for the losses due to the drastic reaction conditions. For instance, it is well-known that tryptophan is completely destroyed during the acidic treatment.

In the proteins of natural origin, aspartic acid and glutamic acid are always present in various quantities. In the table below, there are reported the percentage concentrations of the two aminoacids with respect to the total content of aminoacids obtained by conventional chemical hydrolysis, that is with 6N HCl for a period of 48 hours under reflux, of some proteins of animal origin and vegetable origin. These results are given by way of illustration and are not intended to be limitative.

TABLE

|  | Casein | Albumen | Fish-flour | Soy-flour | Torula |
|---|---|---|---|---|---|
| Aspartic Acid* | 6.8 | 10.8 | 10.4 | 12.7 | 9.7 |
| Glutamic Acid* | 22.4 | 14.9 | 15.6 | 21.4 | 17.4 |

*in percentage with respect to the content of the aminoacids.

An object of the present invention is to provide protein hydrolyzates which are completely or partially free of aspartic acid and glutamic acid.

A further object of the present invention is to obtain by means of a simple economical and easily accessible process, a final product, which consists of mixtures of L-aminoacids in which the ratio between the individual aminoacids present in the original protein is maintained as much as possible, except for the elimination of aspartic acid and glutamic acid, which may be complete or partial.

These mixtures, which occasionally may also contain small additions of other aminoacids or other mixtures of aminoacids from different proteins, obtained in the manner which will be described hereinbelow, must satisfy the requirements of the intended applications. In particular, in the field of clinical nutrition carried out parenterally, both central and peripheral, oral and/or enteral, the object of the invention is to obtain mixtures of L-aminoacids, which maintain a suitable balance between the various essential and non-essential aminoacids. In this manner, in view of the fact that the quantity and the sequence of the various aminoacids are pre-determined from the proteins used as starting materials, it is possible to obtain several formulations, which are therapeutically valuable with aminoacids of high nutritional value and at the same time at a much lower cost than analogous mixtures prepared with individual aminoacids of the so-called "synthetic" origin.

Another object of the invention is to obtain mixtures of aminoacids free of aspartic acid and glutamic acid or containing a controlled level of these two aminoacids with such content of ammonia and electrolytes that the mixtures satisfy the requirements to the individual applications. The problem is particularly important in the field of clinical nutrition and especially parenteral feeding.

The high content of ammonia present in protein hydrolyzates obtained by acid hydrolysis as well as enzymatic hydrolysis, (Ghadimi, H., Kumar, J., Biochem. Med. 5,548 (1971)) has been held responsible for hyperammonemia, which is found in patients to whom these products have been administered, (Dudrick, S. J., MacFady, B. V., Van Buren, C. T., Ruberg, R. L., and Maynard, A. T., Ann. Surg. 176,259 (1972); Ghadimi, H., Abali, F., Kumar, S. and Rathi, M., Pediatrics 48, 955, (1971); Johnson, J. D., Albutton, W. L., and Sunshine, P., J. Pediatr. 81, 151 (1972)).

For the purpose of lowering the content of ammonia in protein hydrolyzates and obtaining hydrolyzates suitable for use in parenteral feeding, while achieving the objects reported hereinabove, it has been customary to add to the hydrolyzates strong inorganic bases, such as NaOH and KOH, so that after evaporation, the ammonium ions concentration present in the final product has decreased. The result of these additions in the protein hydrolyzates causes in addition to some ammonia, also a high content particularly of sodium, which limits the uses in parenteral feeding only to those patients who require the increase of this cation, (Shenkin, A., Wretlind, A., Wld. Rew. Nut. Diet., 28, 1 (1978); Total parenteral nutrition Edit. Josef. E. Fischer, pp. 31–32 (1976)).

In the literature, several methods of isolation of aspartic acid and glutamic acid from protein hydrolyzates are known, including the subsequent step of the separation of the two substances by means of fractional precipitation, methods which today have merely a historical value, as well as more recent chromatographic methods. Among the former methods, reference is made to the discussion in "Chemistry of the Aminoacids", J. P. Greenstein and M. Winitz, Vol. 3, J. Wiley and Sons, ed. 1961, pp. 1856–1865 and 1930–1940.

Among the chromatographic methods of actual value, reference is made to the methods of Cannan, (J. Biol. Chem. 152, 401 (1944) who used Amberlite IR 4 in a batch process and the method of Martin, et al, (Biochem. J. 42, 443 (1948)), who used resins of the type of IRA 400, passing the hydrolyzates on a column in an acidic medium.

Separations of aminoacids in columns have been described both in scientific literature, (S. M. Partdridge, et al, Biochem. J., 44, 418 (1949; ibid, 44, 513 (1949); ibid, 44, 521 (1949) using cation exchange resins, (Zeo-Karb 215), or anionic resins, (Wofatit M., Amberlite IR 4, De Acidite B), as well as in patents such as U.S. Pat. No. 2,937,199 to E. G. Donahue, assigned to Hercules Powder Co., and U.S. Pat. No. 3,045,026 to A. A. Eisenbraun, assigned to Ogilvie Flour Mills Co. In the latter two cases, again cation exchange resins have been used. All this work, however, has brought to the separation of one or more aminoacids or to the fractionation in different groups with yields of doubtful practical value, without achieving mixtures of aminoacids suitable for use as starting material to obtain formulations suitable for instance, for clinical human nutrition.

An object of the present invention is to provide a process, which permits to achieve total separation of aspartic acid and glutamic acid if this is desired.

Another object of the present invention is to decrease the amount of aspartic acid and glutamic acid to such a point as to achieve the desired percentage of these two substances for the purpose of obtaining aminoacid mixtures, called intermediates, which by addition of synthetic aminoacids may be used as mixtures suitable for nutrition in humans and also for zootechnical use and various other uses.

The crux of the present invention resides in utilizing ion exchange resins of the type of Amberlite IRA 400, Relite, and Dowex with strong anionic basic properties, in the $OH^-$ form, which resins are contacted in ionic exchange with aqueous ammoniacal solution of protein hydrolyzates or mixtures of aminoacids of different nature, containing both aspartic acid and glutamic acid, derived for instance from fermentation processes. These aminoacid solutions may be obtained by hydrolysis of proteins, both of animal as well as vegetable origin, such as for instance, soya flour, blood flour, fish flour, feathers, gelatin, casein, the protein residue from liver extracts, albumen, extracts of different organs, bovine skin, torula, wool, mycelium fermentation residue or products which contain proteins derived from the isolation or the enrichment of the protein portion by treatment of materials of natural origin both animal as well as vegetable origin. By way of examples, which are not intended to be limitative, there may be mentioned, concentrates of proteins of gluten from corn and concentrates of proteins from milk serum, etc.

After suitable treatments such as passage on columns containing cation exchange resins for the purpose of eliminating foreign substances followed by subsequent elution, and/or passage on carbon columns in which some aminoacids for instance, aromatic aminoacids, are strongly adsorbed, the ammoniacal solution in which the aminoacids starting materials are soluble, must have a pH not less than 7. There is no upper limit on the pH. In view of the pK of aspartic acid, ($pK_1 = 2.09$—$pK_2 = 3.86$) and glutamic acid, ($pK_1 = 2.19$—$pK_2 = 4.25$), under the experimental conditions mentioned hereinabove, the two aminoacids exhibit an ionization equilibrium, which is mainly in the anionic form, while the other aminoacids may have an ionization equilibrium, which is substantially influenced by the pH of the ammoniacal solution in which the starting materials are dissolved.

Aspartic acid and glutamic acid are adsorbed by the resin, together with other aminoacids. In a subsequent step, elution is carried out by means of ammoniacal solutions, buffers of ammonia/ammonium chloride and ammonia/ammonium acetate, utilizing the competitive affinity between the anion contained in the ammoniacal solution used as the eluent and the resin, with respect to the aminoacids adsorbed on the column. A suitable selection of the eluent is made in order to keep the volume of elution within industrially suitable quantities.

The pH of the ammoniacal solution of ammonium chloride or ammonium acetate, should not be less than 7 while it may be higher than 7. The concentration of $Cl^-$ or $CH_3COO^-$ may vary from very low values to very high values. The quantity of $Cl^-$ or $CH_3COO^-$ ions influences the volume of the eluent necessary for the recovery of the aminoacids and the desired concentration of aspartic acid and glutamic acid in the final mixtures.

Aspartic acid and glutamic acid among the aminoacids, exhibit a greater affinity towards the resin and, therefore, are totally eluted or partially eluted from the resin with retention times, which are different with respect to the other aminoacids.

The ammoniacal eluate is freed of ammonia and part of the water by evaporation under reduced pressure. The aminoacids thus obtained, either in the form of a 50% suspension or in the form of a powder, if they are dried by means of spray driers or by other means, may subsequently be worked up in accordance with the final use to which the mixture thus obtained is intended.

It is noteworthy that the process according to the present invention gives a substantial recovery of the aminoacids, which are not acidic, in the ammonia eluate, between 85 and 90% with respect to the aminoacids present in the starting material; this yield, although it varies as a function of the experimental conditions, is very high. These recoveries are obtained in the case of mixtures of aminoacids, which are totally devoid of aspartic acid and glutamic acid.

If the presence of aspartic acid and glutamic acid in the mixture of aminoacids in an amount substantially lower than in the starting materials is desirable or tolerated, the yield of the process is higher than 95%. In this case, the elution with ammonia/ammonium chloride buffer or ammonia/ammonium acetate buffer is not necessary, but it is sufficient to use a suitable starting material, consisting of aminoacids in which aspartic acid and glutamic acid, in view of their greater ionic affinity towards the resin under the experimental conditions, remove those aminoacids which are more weakly absorbed by the resin.

A further substantial advantage of the process according to the present invention resides in the utilization of a dilute ammoniacal solution at every stage of the process. This fact permits the use of installations which are less costly and less subject to be damaged than installations to be used in an acidic medium. Further, the basic environment of ammonia is particularly useful for the purpose of avoiding formation of bacteria, which could be formed in a moderately acidic medium, which bacteria are particularly harmful in the case of products being used in pharmaceuticals, veterinary, zootechnical, and dietetic applications.

Further, the use of ammonia for the purpose of eluting the aminoacids from the resin column permits to obtain by means of a subsequent concentration under vacuum, a solution or a powder, which may be directly used in the preparation of solutions to be used by infusion.

A very substantial advantage of the process according to the present invention is the cost. In fact, the procedure is very simple from the technological view, it is quickly carried out, devoid of manipulations, so that it may be completely automatized. The process further gives mixtures of aminoacids, which either without any further addition or with small additions of synthetic aminoacids, for the purpose of achieving the proper adjustment of the composition, may be obtained at a cost substantially lower than the same compositions when they are totally obtained by means of synthetic aminoacids. This permits a substantial reduction in the expenses in hospitals when the aminoacid solutions are used in nutritional therapy as is often the case.

The examples which follow illustrate the process according to the invention, but are not intended to be limitative. The fundamental parameters of operation in the examples are summarized hereinbelow and remain constant in all the examples unless expressly stated. It is worthwhile to stress that also these parameters are not intended to be limitative of the process.

Column:
 internal diameter = 10 cm.
 height = 250 cm.
 resin = 11 liters
 type = IRA 400 in the OH$^-$ form.

Feed Solution: mixture of aminoacids dissolved in dilute ammonia brought to a pH of about 10. The actual values of the total quantity of aminoacids and their relative percentage are reported in each example.

Rate of Percolation: the rate of percolation of the feed solution is between 1 volume of solution/hour/volume of resin and 2 volumes of solution/hour/volume of resin (equal to 11 and 22 liters/hour respectively), for the column described hereinabove. The real values are given in the specific examples.

Eluent Solution: (A) Ammonia/ammonium chloride buffer. The solution is prepared by adding to 100 liters of 3N ammonia, 1.4 liters of concentrated hydrochloric acid. The pH of the solution is about 11.
 (B) Ammonia/ammonium acetate buffer. The solution is prepared by adding to 100 liters of 3N ammonia, 0.850 liter of glacial acetic acid. The resulting pH is about 11.2.
 (C) Ammonia/ammonium acetate buffer. The solution is prepared by adding to 100 liters of 0.3N ammonia, 0.85 liter of glacial acetic acid. The pH is about 9.2.

The Period of Time for Feeding the Initial Solution and for Collecting the Eluent Solution These periods of time are specified in each example. On the basis of the period of time used for feeding the initial solution and on the basis of the concentration of aminoacids, it is possible to determine the amount of aminoacids on the column and in particular, the quantity of aspartic acid and glutamic acid. These values are reported in each example. During the phase of feeding the aminoacids on the column, the solution, which passes through the column and which is removed from the column, contains no aminoacids, except when expressly stated. Consistently in all the examples described hereinbelow, the ammoniacal eluate, concentrated under reduced pressure, provides a product devoid of pyrogens and other substances similar to histamine. At the same time, the ammonia content in the mixture results to be less than 0.02 grams per 100 grams of aminoacids in the dry state and the absence of cations of strong bases in the formulations devoid of aspartic acid and glutamic acid is noted. In the formulations which contain some aspartic acid and glutamic acid, the content of the cations is suitable for their use in parenteral nutrition, (see examples 12, 13, and 14) and is substantially lower to the content in the formulations conventionally used in therapy derived from protein hydrolyzates. The solution of aminoacids (A) being used as the feed has the composition reported in the table below.

TABLE 1

| | (Ex. 1) | |
|---|---|---|
| | g AA/l of ammoniacal solution | % of each AA in 100 g of mixture |
| Aspartic Acid | 2.71 g | 7.08 |
| Threonine | 1.64 g | 4.28 |
| Serine | 2.11 g | 5.51 |
| Glutamic Acid | 9.81 g | 25.63 |
| Proline | 5.33 g | 13.92 |
| Glycine | 1.05 g | 2.74 |
| Alanine | 1.70 g | 4.44 |
| Valine | 2.77 g | 7.24 |
| Methionine | 1.02 g | 2.66 |
| Isoleucine | 1.79 g | 4.59 |
| Leucine | 3.95 g | 10.32 |
| Tyrosine | — g | — |
| Phenylalanine | — g | — |
| Lysine | 3.54 g | 9.25 |
| Histidine | 0.86 g | 2.26 |
| Arginine | — g | — |
| Total aminoacids | 38.28 g | |

The rate of percolation in this specific case is 11 liters per hour per volume, which corresponds to a volume (V) of solution per hour per volume of resin. After 140 minutes of feeding the solution, the presence of aminoacids in the ammoniacal solution, which percolates through the column of resin is not noted or at the most, it is noted in very insignificant amounts. After a subsequent period of 60 minutes of feeding the ammoniacal solution, which contains aminoacids in the concentrations reported hereinabove, there is obtained 420 grams of aminoacids in the solution which leaves the resin column. In this fraction, the content of aspartic acid is almost zero while glutamic acid is present in the proportion of 0.085 grams per liter of solution, which has gone through the resin, corresponding to 0.935 grams total per 420 grams of aminoacids eluted in 60 minutes. The percentage of glutamic acid is 0.22% with respect to the mixture of aminoacids. After an additional period of 160 minutes, during which the ammoniacal solution, containing aminoacids in the proportion reported hereinabove, is passed through the column, the solution which percolates through the resin contains 52.31 grams of aspartic acid and 99.25 grams of glutamic acid per 984 grams of total mixture of aminoacids, corresponding to 1.78 grams of aspartic acid per liter and 3.38 grams of glutamic acid per liter of solution, which has gone through the resin. In this fraction obtained after 160 minutes, the percentage content of aspartic acid and glutamic acid are 5.32% and 10.09% respectively. In conclusion, in the two fractions with a total of 220 minutes of percolation, there are obtained a total of 52.31 grams of aspartic acid and 100.18 grams of glutamic acid in the mixture of 1404 aminoacids, corresponding to 3.73% of aspartic acid in 100 grams of aminoacids and 7.14% of glutamic acid in 100 grams of aminoacids. There is, therefore, an adsorption of substantial quantities of these two aminoacids in the resin used.

EXAMPLE 2

The solution being fed in Example 2 consists of a mixture of aminoacids with the composition as reported in Table 2. The concentration and the relative quantity of the aminoacids remain constant in Examples 3-6.

TABLE 2

| | (Ex. 2) | |
|---|---|---|
| | g AA/l of ammoniacal solution | % of each AA in 100 g of mixture |
| Aspartic Acid | 2.65 g | 7.07 |
| Threonine | 1.50 g | 4.00 |
| Serine | 2.03 g | 5.42 |
| Glutamic Acid | 9.49 g | 25.33 |
| Proline | 5.57 g | 14.87 |
| Glycine | 0.86 g | 2.30 |
| Alanine | 1.58 g | 4.22 |
| Valine | 2.78 g | 7.42 |
| Methionine | 0.93 g | 2.48 |
| Isoleucine | 1.76 g | 4.70 |
| Leucine | 3.94 g | 10.52 |
| Tyrosine | — g | — |
| Phenylalanine | — g | — |
| Lysine | 3.61 g | 9.63 |
| Histidine | 0.77 g | 2.05 |
| Arginine | — g | — |
| Total aminoacids | 37.47 g | |

RATE OF PERCOLATION = 1 volume of solution/hour/volume of resin
PERIOD OF FEEDING THE SOLUTION = 120 minutes
QUANTITY OF AMINOACIDS PLACED ON THE COLUMN = 824.3 grams
ASPARTIC ACID PLACED ON THE COLUMN = 58.3 grams
GLUTAMIC ACID PLACED ON THE COLUMN = 208.8 grams
ELUENT SOLUTION = Buffer A
PERIOD FOR THE ELUTION = 240 minutes
VOLUME COLLECTED = 44 liters Table 3 summarizes the recovery of the aminoacids placed on the column and the respective proportions. The recovery of the aminoacids after elution is 472.1 grams while the theoretical recovery is 557.3 grams if one subtracts the amount of aspartic acid and glutamic acid from the total quantity of aminoacids placed in the column. This yield corresponds to 84.7% of the theory. In the final mixture, which is free of aspartic acid and glutamic acid, the chlorine content is 0.7%.

TABLE 3

| | (Ex. 2) | | | |
|---|---|---|---|---|
| | AA placed on the column, in grams | AA recovered in grams | % of recovery | % of each AA in 100 g of the mixture |
| Aspartic Acid | 58.3 | 0 | 0 | / |
| Threonine | 33.0 | 31.1 | 94.2 | 6.6 |
| Serine | 44.7 | 39.1 | 87.5 | 8.3 |
| Glutamic Acid | 208.8 | 0 | 0 | / |
| Proline | 122.5 | 109.9 | 89.7 | 23.3 |
| Glycine | 18.9 | 17.8 | 94.2 | 3.8 |
| Alanine | 34.8 | 33.8 | 97.1 | 7.1 |
| Valine | 61.2 | 53.4 | 87.3 | 11.3 |
| Methionine | 20.5 | 8.7 | 42.4 | 1.8 |
| Isoleucine | 38.7 | 27.7 | 71.6 | 5.8 |
| Leucine | 86.7 | 60.2 | 69.4 | 12.7 |
| Tyrosine | / | | | / |
| Phenylalanine | / | | | / |
| Lysine | 79.4 | 80.0 | 100.8 | 17.0 |
| Histidine | 16.9 | 10.4 | 61.5 | 2.2 |
| Arginine | / | | | / |
| Total | 824.4 | 472.1 | | |

EXAMPLE 3

The solution being fed on the column, the rate of flow, the period for feeding the solution, the buffer used, that is type A, are the same as in Example 2.
ELUTION PERIOD = 300 minutes
VOLUME COLLECTED = 55 liters Table 4 summarizes the recovery and the balance with respect to the aminoacids placed on the column. The data reported in Table 4 shows a recovery of all the aminoacids superior to 93% with the exception of methionine, the recovery of which is 84.4%. The quantity of aspartic acid in percent composition is about 1/6 of the quantity present in the initial mixture while the quantity of glutamic acid is about ¼ the amount initially present. The chlorine contained in the final mixture is 2.6% with respect to the aminoacids present.

TABLE 4

| | (Ex. 3) | | |
|---|---|---|---|
| | AA placed on the column, in grams | AA recovered in grams | % of recovery | % of each AA in 100 g of the mixture |
| Aspartic Acid | 58.3 | 7.7 | 13.2 | 1.3 |
| Threonine | 33.0 | 33.9 | 102.7 | 5.7 |
| Serine | 44.7 | 46.0 | 102.9 | 7.7 |
| Glutamic Acid | 208.8 | 44.8 | 21.5 | 7.5 |
| Proline | 122.5 | 114.7 | 93.6 | 19.3 |
| Glycine | 18.9 | 19.4 | 102.6 | 3.3 |
| Alanine | 34.8 | 35.4 | 101.7 | 6.0 |
| Valine | 61.2 | 61.2 | 100.0 | 10.3 |
| Methionine | 20.5 | 17.3 | 84.4 | 2.9 |
| Isoleucine | 38.7 | 36.1 | 93.3 | 6.1 |
| Leucine | 86.7 | 81.0 | 93.4 | 13.6 |
| Tyrosine | / | | | |
| Phenylalanine | / | | | |
| Lysine | 79.4 | 80.6 | 101.5 | 13.6 |
| Histidine | 16.9 | 16.1 | 95.3 | 2.7 |
| Arginine | / | | | |
| Total | 824.4 | 594.2 | | |

EXAMPLE 4

RATE OF PERCOLATION = 1.74 volume of solution/hour/volume of resin
PERIOD OF TIME FOR FEEDING THE SOLUTION = 120 minutes
QUANTITY OF AMINOACIDS PLACED ON THE COLUMN = 876.8 grams
ASPARTIC ACID PLACED ON THE COLUMN = 62 grams
GLUTAMIC ACID PLACED ON THE COLUMN = 222.1 grams
PERIOD FOR THE ELUTION = 140 minutes
VOLUME COLLECTED = About 44.6 liters
ELUENT SOLUTION = Buffer A Table 5 hereinbelow shows the recovery and the balance of the individual aminoacids. The recovery of the aminoacids after elution is 511.6 grams while the theoretical value, after subtracting the amount of aspartic acid and glutamic acid from the total amount of aminoacids placed on the column is 592.7 grams. This corresponds to a yield of 86.3%. The content of chlorine in the final mixture, devoid of aspartic acid and glutamic acid is 1.4% of the aminoacids present.

TABLE 5

| | (Ex. 4) | | | |
|---|---|---|---|---|
| | AA placed on the column, in grams | AA recovered, in grams | % of recovery | % of each AA in 100 g of the mixture |
| Aspartic Acid | 62.0 | 0 | 0 | / |
| Threonine | 35.1 | 33.1 | 94.3 | 6.5 |
| Serine | 47.6 | 43.5 | 91.4 | 8.5 |
| Glutamic Acid | 222.1 | 0 | 0 | / |
| Proline | 130.5 | 112.4 | 86.1 | 22.0 |
| Glycine | 20.2 | 19.8 | 98.0 | 3.9 |
| Alanine | 37.1 | 35.7 | 96.2 | 7.0 |
| Valine | 65.0 | 56.0 | 86.2 | 10.9 |
| Methionine | 21.7 | 12.3 | 56.7 | 2.4 |
| Isoleucine | 41.1 | 32.4 | 78.8 | 6.3 |
| Leucine | 92.1 | 69.9 | 75.9 | 13.7 |
| Tyrosine | / | | | |
| Phenylalanine | / | | | |
| Lysine | 84.4 | 85.0 | 100.8 | 16.6 |
| Histidine | 17.9 | 11.5 | 64.4 | 2.2 |
| Arginine | | | | |
| Total | 876.8 | 511.6 | | |

EXAMPLE 5

Example 5 is carried out in the same manner as Example 4 with the only change in the duration in the period of elution, that is 180 minutes and consequently the volume of solution collected, which is 57.5 liters.

Table 6 hereinbelow summarizes the recovery and the balance of the aminoacids placed on the column.

The data reported in Table 6 show that the recovery of all the aminoacids is greater than 90% with the exception of methionine and histidine to which the recovery is greater than 80%. The quantity of aspartic acid in percentage composition is about 1/6 the amount of aspartic acid initially present. These results are in agreement with the data reported in Example 3 in which the rate of feeding was lower. The chlorine content in the final mixture is 3.1%.

TABLE 6

| | (Ex. 5) | | | |
|---|---|---|---|---|
| | AA placed on the column, in grams | AA recovered, in grams | % of recovery | % of each AA in 100 g of the mixture |
| Aspartic Acid | 62.0 | 6.7 | 10.8 | 1.1 |
| Threonine | 35.1 | 35.6 | 101.4 | 5.7 |
| Serine | 47.6 | 48.8 | 102.5 | 7.9 |
| Glutamic Acid | 222.1 | 42.5 | 19.1 | 6.8 |
| Proline | 130.5 | 124.6 | 95.5 | 20.1 |
| Glycine | 20.2 | 20.8 | 103.0 | 3.4 |
| Alanine | 37.1 | 37.45 | 100.9 | 6.0 |
| Valine | 65.0 | 64.8 | 99.7 | 10.4 |
| Methionine | 21.7 | 17.45 | 80.4 | 2.8 |
| Isoleucine | 41.1 | 37.7 | 91.7 | 6.1 |
| Leucine | 92.2 | 83.0 | 90.0 | 13.4 |
| Tyrosine | / | | | / |
| Phenylalanine | / | | | / |
| Lysine | 84.4 | 86.0 | 101.9 | 13.9 |
| Histidine | 17.9 | 15.2 | 84.9 | 2.4 |
| Arginine | / | | | / |
| Total | 876.8 | 620.6 | | |

EXAMPLE 6

This example is carried out in the same manner as examples 4 and 5 with respect to the conditions of the column, the amount of aminoacids, the rate of feed and the type of solution being used for the elution. The period of time for the elution is 150 minutes, corresponding to passing about 48 liters of ammoniacal solution of ammonium chloride.

Table 7 summarizes the recovery and the balance with respect to all the aminoacids passed on the column. The chlorine content in the final mixture is 1.8%. Examples 4, 5, and 6 show that it is possible to obtain mixtures of aminoacids with a different content of aspartic acid and glutamic acid by varying in appropriate manner the period of time of elution.

TABLE 7

| | (Ex. 6) | | |
|---|---|---|---|
| | AA placed on the columns in grams | AA recovered in grams | % of recovery | % of each AA in 100 grams of mixture |
| Aspartic Acid | 62.0 | 0.20 | 0.3 | 0.04 |
| Threonine | 35.1 | 33.4 | 95.2 | 6.3 |
| Serine | 47.6 | 44.6 | 93.9 | 8.4 |
| Glutamic Acid | 222.1 | 4.1 | 1.8 | 0.8 |
| Proline | 130.5 | 118.9 | 91.2 | 22.4 |
| Glycine | 20.2 | 20.4 | 101.1 | 3.8 |
| Alanine | 37.1 | 37.3 | 100.6 | 7.0 |
| Valine | 65.0 | 61.2 | 94.2 | 11.5 |
| Methionine | 21.7 | 12.4 | 57.20 | 2.3 |
| Isoleucine | 41.1 | 32.1 | 78.1 | 6.0 |
| Leucine | 92.2 | 69.6 | 75.5 | 13.1 |
| Tyrosine | / | | | |
| Phenylalanine | / | | | |
| Lysine | 84.4 | 85.0 | 100.8 | 16.0 |
| Histidine | 17.9 | 11.5 | 64.4 | 2.2 |
| Arginine | / | | | |
| Total | 876.8 | 530.7 | | |

EXAMPLE 7

This example is carried out in the same manner as Example 5 with the only variation that buffer B, that is ammonia/ammonium acetate is used. The quantity of aminoacids passed on the column is 886.5 grams and the aspartic acid and glutamic acid content are respectively 61.7 grams and 221.4 grams. The data of concentration and percentage composition of the solution being fed do not substantially vary from the data reported in the preceeding examples. Also, the pH does not vary.

Table 8 hereinbelow summarizes the recovery and the balance with respect to the aminoacids passed on the column. The recovery of the aminoacids after the elution is 539.4 grams, while the theoretical recovery is 603 grams after subtracting aspartic acid and glutamic acid from the quantity of aminoacids placed on the column. This corresponds to 89.4% of the theory. The acetate content in the final mixture, devoid of aspartic acid and glutamic acid, is 1%.

TABLE 8

| | (Ex. 7) | | |
|---|---|---|---|
| | AA placed on the column in grams | AA recovered in grams | % of recovery | % of each AA in 100 grams of mixture |
| Aspartic Acid | 61.7 | 0 | 0 | / |
| Threonine | 35.7 | 34.9 | 97.9 | 6.5 |
| Serine | 47.5 | 45.9 | 96.7 | 8.5 |
| Glutamic Acid | 221.4 | 0 | 0 | / |
| Proline | 126.0 | 118.9 | 94.4 | 22.0 |
| Glycine | 21.2 | 20.4 | 96.4 | 3.8 |
| Alanine | 37.6 | 37.9 | 100.7 | 7.0 |
| Valine | 65.7 | 60.1 | 91.5 | 11.1 |
| Methionine | 23.4 | 13.2 | 56.5 | 2.45 |
| Isoleucine | 43.8 | 34.4 | 78.6 | 6.4 |
| Leucine | 96.2 | 73.6 | 76.5 | 13.6 |
| Tyrosine | / | | | |
| Phenylalanine | / | | | |

TABLE 8-continued

| | (Ex. 7) | | |
|---|---|---|---|
| | AA placed on the column in grams | AA recovered in grams | % of recovery | % of each AA in 100 grams of mixture |
| Lysine | 87.1 | 86.2 | 99.0 | 16.0 |
| Histidine | 19.2 | 13.9 | 72.6 | 2.6 |
| Arginine | / | | | |
| Total | 886.5 | 539.4 | | |

EXAMPLE 8

This example is carried out in the same manner as Example 7 with the same solution being fed and the same experimental conditions, but buffer C, that is ammonia/more dilute ammonium acetate is used. The elution phase with ammoniacal solution of ammonium acetate lasts 195 minutes, corresponding to passing about 62 liters of the ammoniacal solution of ammonium acetate.

Table 9 hereinbelow illustrates the recovery and the balance with respect to the aminoacids passed on the column. The recovery of the aminoacids after elution is 526.9 grams while the theoretical recovery, after subtracting the quantity of aspartic acid and glutamic acid from the quantity of aminoacids passed on the column, is 603 grams. This corresponds to 87.4% recovery. The acetate content in the final mixture is 1:1%.

TABLE 9

| | (Ex. 8) | | |
|---|---|---|---|
| | AA placed on the column in grams | AA recovered in grams | % of recovery | % of each AA in 100 grams of mixture |
| Aspartic Acid | 61.7 | 0 | 0 | / |
| Threonine | 35.7 | 33.2 | 93.0 | 6.3 |
| Serine | 47.5 | 44.1 | 92.8 | 8.4 |
| Glutamic Acid | 221.4 | 0 | 0 | / |
| Proline | 126.0 | 115.0 | 91.3 | 21.8 |
| Glycine | 21.2 | 20.2 | 95.3 | 3.8 |
| Alanine | 37.6 | 36.0 | 95.7 | 6.8 |
| Valine | 65.7 | 59.3 | 90.3 | 11.3 |
| Methionine | 23.4 | 12.9 | 55.1 | 2.4 |
| Isoleucine | 43.8 | 34.0 | 77.6 | 6.5 |
| Leucine | 96.2 | 72.8 | 75.7 | 13.8 |
| Tyrosine | / | | | |
| Phenylalanine | / | | | |
| Lysine | 87.1 | 86.0 | 98.7 | 16.3 |
| Histidine | 19.2 | 13.4 | 69.8 | 2.5 |
| Arginine | / | | | |
| Total | 886.5 | 526.9 | | |

The research work carried out by Fischer, et al, (Pathogenesis and Therapy of Hepatic Coma"—Progress in Liver Disease—Volume V—1975; "The Role of Plasma Amino Acids in Hepatic Encephalopathy", Surgery Vol. 80, No. 1, page 77-91 (1976); "Chronic Hepatic Encephalopathy—Long Term Therapy with a Branched Amino Acids Enriched Elemental Diet'-'—JAMA—Vol. 242, No. 4, pages 347-349, (1979)), has shown that patients with chronic hepatic conditions and cirrhosis exhibit a pattern of aminoacids in the plasma substantially different from normal people: phenylalanine, tyrosine, glutamic acid, aspartic acid, and methionine are present in substantially increased amounts, while the amounts of isoleucine, leucine, and valine have shown a substantial decrease.

In addition the ratio of Val+Isoleuc.+Leuc. Phenylal.+Tyrosine of plasmatic aminoacids exhibits a substantial correlation with the degree of encephalopathy. Indeed, when this ratio of about 1 in the case of encephalopathy is brought back to normal values, that is 3–3.5, a substantial improvement in encephalopathy is found. Improvements in the general and neurological state of these patients have been demonstrated when during the course of the parenteral alimentation of those patients, they are fed solutions of aminoacids, which have a high content of isoleucine-leucine-valine, that is the branched chain aminoacids and a lower content of methionine-phenylalanine-tryptophan and further, when the solutions are totally free of aspartic acid, glutamic acid, and tyrosine. This type of formulation may be easily achieved with the process according to the examples described hereinabove and above all is economically convenient with respect to analogous formulations prepared with aminoacids of "synthetic origin". Indeed, if casein is utilized as the starting material after complete acid hydrolysis, one obtains a mixture of aminoacids, which after suitable treatments and passage on resins of the type described in Examples 2, 4, 7, and 8, exhibits an average percentage composition in aminoacids as shown in the examples reported hereinabove, of the type shown in Table 10 hereinbelow. In the table, the values in parentheses represent the permissible ranges in mixtures derived from protein hydrolysates.

TABLE 10

| Threonine | 6.5 | (5.8–7.1) |
|---|---|---|
| Serine | 8.3 | (7.5–9.1) |
| Proline | 22.3 | (20.1–24.5) |
| Glycine | 3.8 | (3.4–4.2) |
| Alanine | 7.0 | (6.3–7.7) |
| Valine | 10.9 | (9.8–12.0) |
| Methionine | 2.2 | (2–2.4) |
| Isoleucine | 6.2 | (5.6–6.8) |
| Leucine | 13.2 | (11.9–14.5) |
| Lysine | 17.2 | (15.5–18.9) |
| Histidine | 2.4 | (2.2–2.6) |

This composition may be brought to optimum values as discussed hereinabove by a simple integration with relatively small quantities of some aminoacids: "elaborated mixtures" are obtained as shown in the following examples, which are offered by way of illustration and are not intended to be limitative.

EXAMPLE 9

To 100 grams of a mixture having the composition illustrated in Table 10 obtained according to the process described in Examples 2, 4, 7, and 8, there are added 1.5 grams of phenylalanine, 8.5 grams of arginine, and 1 gram of tryptophan, that is only 11% of the integrating aminoacids: an elaborated mixture is obtained having the percentage composition reported in Table 11.

TABLE 11

| | (Ex. 9) | |
|---|---|---|
| Threonine | 5.8 | (5.2–6.4) |
| Serine | 7.5 | (6.7–8.2) |
| Proline | 20.0 | (18.0–22.0) |
| Glycine | 3.4 | (3.1–3.7) |
| Alanine | 6.3 | (5.7–6.9) |
| Valine | 9.8 | (8.8–10.8) |
| Methionine | 2.0 | (1.8–2.2) |
| Isoleucine | 5.6 | 5.0–6.2) |
| Leucine | 11.9 | (10.7–13.1) |
| Phenylalanine | 1.4 | (1.3–1.5) |
| Lysine | 15.5 | (14.0–17.0) |
| Histidine | 2.2 | (2.0–2.4) |
| Arginine | 7.7 | (6.9–8.5) |

TABLE 11-continued

| | (Ex. 9) | |
|---|---|---|
| Tryptophan | 0.9 | (0.8–1.0) |

The values in parentheses are the permissible ranges in analogous formulations derived from protein hydrolyzates.

The addition of phenylalanine and tryptophan is due to the fact that both substances are essential aminoacids, which are absent in the previous formulations; the addition, however, must be small in order to comply with the requirements reported in the above cited literature reports. Arginine is added because of its detoxifying ability with respect to endogenic ammonia produced by deamination of aminoacids, (Meister, A., "Biochemistry of the Amino Acids", 2nd Ed., Ac. Press, N.Y. 1965; "Arginine, Ornithine and Citrulline—Urea Synthesis", pp. 685–707; J. S. Najarian and H. A. Harper, Am. J. Med. 21, 832 (1956)).

The presence of electrolytes in 100 grams of the elaborated mixture of aminoacids is reported hereinbelow with reference to the mixtures obtained in examples 2, 4, 7, and 8 of the present invention.

Example 2: $Cl^-$ 0.65% of the elaborated mixture
Example 4: $Cl^-$ 1.30% of the elaborated mixture
Example 7: $CH_3COO^-$ 0.90% of the elaborated mixture
Example 8: $CH_3COO^-$ 1.00% of the elaborated mixture In this formulation, both the aminoacid compositions, as well as the content of electrolytes and specifically the absence of cations and $NH_3 \leq 0.02\%$ are perfectly suitable for use in every case in which the formulation itself may cause improvements in the general condition of the patients and particularly patients with serious hepatic conditions.

Table 12 summarizes the fundamental nutritional parameters of the elaborated mixture of the aminoacids of example 9.

TABLE 12

| | Comp in % after integration | (1) | (2) | (3) | (4) | (5) |
|---|---|---|---|---|---|---|
| Aspartic Acid | | | | | | |
| Threonine | 5.8 | 0.681 | 5.8 | | 381 | 110 |
| Serine | 7.5 | 0.999 | | | | |
| Glutamic Acid | | | | | | |
| Proline | 20.0 | 2.434 | | | | |
| Glycine | 3.4 | 0.634 | | | | |
| Alanine | 6.3 | 0.990 | | | | |
| Valine | 9.8 | 1.173 | 9.8 | 9.8 | 644 | 185 |
| Methionine | 2.0 | 0.188 | 2.0 | | 131 | 38 |
| Isoleucine | 5.6 | 0.598 | 5.6 | 5.6 | 368 | 106 |
| Leucine | 11.9 | 1.271 | 11.9 | 11.9 | 782 | 225 |
| Tyrosine | | | | | | |
| Phenylalanine | 1.4 | 0.093 | 1.4 | | 92 | 26 |
| Lysine | 15.5 | 2.970 | 15.5 | | 1018 | 293 |
| Histidine | 2.2 | 0.596 | | | | |
| Arginine | 7.7 | 2.476 | | | | |
| Tryptophan | 0.9 | 0.123 | 0.9 | | 59 | 17 |
| | | 15.226 | 52.9 | 27.3 | 3,475 | |

(1) = grams of total nitrogen in 100 g of AA
(2) = grams of AAE (essential aminoacids) in 100 g of AA
(3) = grams of BCAA (branched chain aminoacids) in 100 g of AA
(4) = mg of each AAE/g of total nitrogen
(5) = mg of each AAE/g of total AAE.

Recent studies have shown the importance of the content of valine, isoleucine, leucine, that is the branched chain aminoacids, BCAA in aminoacid solutions used in parenteral feeding. The observations reported by various authors have attributed to these three aminoacids special anti-catabolic effects (Buse, M. G., Reid, M., J. Clin. Invest., 58, 1251, (1975); R. M. Fulks, J. B. Li, A. L. Goldberg, J. Biol. Chem. 250, 280 (1975)).

Studies in vivo in rats have shown a superior utilization of the nitrogen present in aminoacid solutions during the period after an operation when these solutions had been modified increasing their content in BCAA. (H. Freund, N. Yoshimura, L. Lunetta, J. E. Fischer, Surgery, 83, 611 (1978); Tetsuya Kishi, Yasuo Iwasawa, Hiroshi Itoh, Ichiro Chibata, J. Nutrit. 110, 710 (1980); Erich Vinars, P. Furst, S. O. Liljedahl, J. Larson, B. Schild, J. Parent. Enter. Nutrit., Vol. 4, No. 2, pp. 184 (1980)), have shown the inadequate effect of two solutions of aminoacids, one based on the requirements according to Rose, (J. Biol. Chem. 217, 987 (1955)) and the other based on the aminoacid pattern in man, (Energy and Protein Requirements, report of a joint FAO-WHO Experts Group, 1973), during the period after an operation noting a substantial catabolism with a substantial increase of leucine, valine and isoleucine in the intracellular liquid of muscles.

As it has been already stated, one obtains from examples 2, 4, 7, and 8, a mixture of aminoacids with the percentage composition reported in Table 10. The content of valine+isoleucine+leucine of this mixture is 30.3% with respect to the other aminoacids and is, therefore, suitable to constitute a basic formulation to obtain a mixture having a high content in BCAA. The economical convenience resulting from the use of this mixture is analogous to the results already shown in Example 9. Also in this case, it is possible to achieve easily an "elaborated mixture" by integration with a relatively limited percentage of the absent aminoacids. Examples 10 and 11 hereinbelow are given by way of illustration and are not intended to be limitative.

EXAMPLE 10

To 100 grams of a mixture having the composition reported in Table 10 obtained according to Examples 2, 4, 7, and 8 are added 1.0 grams of methionine, 6 grams of phenylalanine, 5.0 grams of arginine, and 2.0 grams of tryptophan. Thus, the integration is limited to 14% with respect to the initial mixture. The elaborated mixture, therefore, has the percentage composition shown in Table 13.

TABLE 13

| | (Ex. 10) | |
|---|---|---|
| Threonine | 5.7 | (5.1–6.3) |
| Serine | 7.3 | (6.6–8.0) |
| Proline | 19.6 | (17.6–21.6) |
| Glycine | 3.3 | (3.0–3.6) |
| Alanine | 6.1 | (5.5–6.7) |
| Valine | 9.6 | (8.6–10.6) |
| Methionine | 2.8 | (2.5–3.1) |
| Isoleucine | 5.4 | (4.9–5.9) |
| Leucine | 11.6 | (10.4–12.8) |
| Phenylalanine | 5.3 | (4.8–5.8) |
| Lysine | 15.1 | (13.6–16.6) |
| Histidine | 2.1 | (1.9–2.3) |
| Arginine | 4.4 | (4.0–4.8) |
| Tryptophan | 1.7 | (1.5–1.9) |

The presence of electrolytes in 100 grams of the elaborated mixture of aminoacids is as follows with reference to the mixtures obtained in Examples 2, 4, 7 and 8:
Example 2: $Cl^-$ 0.6% of the elaborated mixture
Example 4: $Cl^-$ 1.23% of the elaborated mixture
Example 7: $CH_3COO^-$ 0.88% of the elaborated mixture
Example 8: $CH_3COO^-$ 0.95% of the elaborated mixture The composition of the elaborated mixture in aminoacids, the content in BCAA, 27.3% with respect to the total, the content of electrolytes, for example, absence of cations; $NH_3 \leq 0.02\%$, are perfectly suitable for use of the formulation in every instance in which this type of formulation may cause improvement in the general condition of the patients, in particular, patients having trauma and sepsis.

Table 14 summarizes the fundamental nutritional parameters of the formulation reported in Table 13.

TABLE 14

| | (Ex. 10) | | | | | |
|---|---|---|---|---|---|---|
| | Comp. in % after integration | (1) | (2) | (3) | (4) | (5) |
| Aspartic Acid | | | | | | |
| Threonine | 5.7 | 0.600 | 5.7 | | 401 | 98 |
| Serine | 7.3 | 0.858 | | | | |
| Glutamic Acid | | | | | | |
| Proline | 19.6 | 2.385 | | | | |
| Glycine | 3.3 | 0.616 | | | | |
| Alanine | 6.1 | 0.959 | | | | |
| Valine | 9.6 | 1.148 | 9.6 | 9.6 | 676 | 166 |
| Methionine | 2.8 | 0.263 | 2.8 | | 197 | 48 |
| Isoleucine | 5.4 | 0.577 | 5.4 | 5.4 | 380 | 93 |
| Leucine | 11.6 | 1.239 | 11.6 | 11.6 | 817 | 200 |
| Tyrosine | | | | | | |
| Phenylalanine | 5.3 | 0.449 | 6.0 | | 422 | 104 |
| Lysine | 15.1 | 2.893 | 15.1 | | 1,063 | 261 |
| Histidine | 2.1 | 0.569 | | | | |
| Arginine | 4.4 | 1.415 | | | | |
| Tryptophan | 1.7 | 0.233 | 1.7 | | 120 | 29 |
| | | 14.200 | 57.9 | 27.6 | 4,076 | |

The meaning of (1), (2), (3), (4), and (5) are the same as in Table 12.

Example 11 illustrates the addition to 100 grams of the mixture of the composition reported in Table 10 of 1 gram of methionine, 0.8 grams of tyrosine, 3.4 grams of phenylalanine, 5 grams of arginine, and 1.9 grams of tryptophan. The resulting re-elaborated mixture has the following composition in aminoacids.

TABLE 15

| | (Ex. 11) | |
|---|---|---|
| Threonine | 5.8% | (5.2–6.4) |
| Serine | 7.4% | (6.6–8.2) |
| Proline | 19.9% | (17.9–21.9) |
| Glycine | 3.4% | (3.0–3.7) |
| Alanine | 6.2% | (5.5–6.9) |
| Valine | 9.7% | (8.7–10.7) |
| Methionine | 2.8% | (2.5–3.1) |
| Isoleucine | 5.5% | (4.9–6.1) |
| Leucine | 11.8% | (10.6–13.0) |
| Tyrosine | 0.7% | (0.6–0.8) |
| Phenylalanine | 3.0% | (2.7–3.3) |
| Tryptophan | 1.7% | (1.5–1.9) |
| Lysine | 15.3% | (13.7–16.9) |
| Histidine | 2.1% | (1.8–2.3) |
| Arginine | 4.5% | (4.0–5.0) |

The presence of electrolytes in 100 grams of the elaborated mixture of aminoacids is as shown hereinbelow, with reference to the mixtures obtained in Examples 2, 4, 7, and 8:
Example 2: $Cl^-$ ~0.6% of the elaborated mixture
Example 4: $Cl^-$ ~1.2% of the elaborated mixture
Example 7: $CH_3COO^-$ ~0.9% of the elaborated mixture
Example 8: $CH_3COO^-$ ~1.0% of the elaborated mixture The composition of the elaborated mixture in aminoacids, the content of branched chain aminoacids, 27.0% with respect to the total, the content of essential aminoacids, which is 55.6% with respect to the total and the low content of anions make this formulation suitable in each instance in which it may cause improvements in the conditions of the patients and particularly patients having trauma and sepsis.

TABLE 16

(Ex. 11)

|  | Comp. in % after integration | (1) | (2) | (3) | (4) | (5) |
|---|---|---|---|---|---|---|
| Aspartic Acid | | | | | | |
| Threonine | 5.8 | 0.682 | 5.8 | | 401 | 104 |
| Serine | 7.4 | 0.986 | | | | |
| Glutamic Acid | | | | | | |
| Proline | 19.9 | 2.422 | | | | |
| Glycine | 3.4 | 0.634 | | | | |
| Alanine | 6.2 | 0.975 | | | | |
| Valine | 9.7 | 1.160 | 9.7 | 9.7 | 671 | 174 |
| Methionine | 2.8 | 0.263 | 2.8 | | 194 | 50 |
| Isoleucine | 5.5 | 0.587 | 5.5 | 5.5 | 380 | 99 |
| Leucine | 11.8 | 1.260 | 11.8 | 11.8 | 816 | 212 |
| Tyrosine | 0.7 | 0.054 | | | | |
| Phenylalanine | 3.0 | 0.254 | 3.0 | | 208 | 54 |
| Tryptophan | 1.7 | 0.233 | 1.7 | | 118 | 31 |
| Lysine | 15.3 | 2.931 | 15.3 | | 1058 | 275 |
| Histidine | 2.1 | 0.569 | | | | |
| Arginine | 4.5 | 1.447 | | | | |
| | | 14.457 | 55.6 | 27.0 | 3846 | |

The meaning of (1), (2), (3), (4), and (5) are the same as in Table 12.

EXAMPLE 12

The column used is the same as in the preceding examples. The rate of percolation in this specific case is 1.74 volumes of solution/hour/volume of resin. The solution being fed consists of a mixture of aminoacids with the proportions reported hereinbelow dissolved in dilute ammonia with final pH about 10.

TABLE 17

(ex. 12)

|  | grams AA/1 of solution | grams AA/100 g of the mixture of aminoacids |
|---|---|---|
| Aspartic Acid | 2.92 | 7.29 |
| Threonine | 1.63 | 4.07 |
| Serine | 2.09 | 5.22 |
| Glutamic Acid | 10.29 | 25.71 |
| Proline | 5.17 | 12.92 |
| Glycine | 0.93 | 2.32 |
| Alanine | 1.61 | 4.02 |
| Valine | 2.97 | 7.42 |
| Methionine | 1.17 | 2.92 |
| Isoleucine | 1.91 | 4.77 |
| Leucine | 4.01 | 10.02 |
| Tyrosine | 0.10 | 0.25 |
| Phenylalanine | 0.06 | 0.15 |
| Lysine | 3.98 | 9.94 |
| Histidine | 1.10 | 2.75 |
| Arginine | 0.09 | 0.22 |
| Total aminoacids | 40.03 | |

The ammoniacal solution of the composition described hereinabove is passed over the column over a period of 210 minutes. At the end of this period, water is percolated for a period of 60 minutes.

During the first 90 minutes, the solution which goes through the column containing no aminoacids. After this period, a phase of collection is begun, which continues up to the end of the percolation of water. The phase of collection, therefore, lasts for a period of 180 minutes. Table 18 hereinbelow shows the recovery and the balance with respect to the aminoacids, which are passed on the column. The recovery of the aminoacids is 1,869 grams while the theoretical recovery, after subtracting from the quantity of aminoacids passed on the column, 142 grams of aspartic acid and 455 grams of glutamic acid, which are adsorbed by the column is 2,009 grams, which corresponds to 93% of the theory.

The mixture of aminoacids thus obtained exhibits a balance between aminoacids having acidic properties and aminoacids having basic properties which is about the same. For this reason, the addition of small quantities of inorganic and organic bases permits to obtain after concentration under reduced pressure, a product the content of which in ammonia is lower than 0.02 grams per 100 g of aminoacids and having lower quantity of cations if an inorganic base is used or totally devoid of cations and anions if an organic base is used. The choice of the inorganic or organic bases depends on the type of application for which the product is intended.

In the case of a mixture intended for parenteral or enteral use, the inorganic bases, which may be used may contain cations in a physiologically useful quantity or a quantity not harmful to pathological conditions for which the product is intended, such as for instance, $NaOH—KOH—Mg(OH)_2—Ca(OH)_2$. This example is given merely by way of illustration.

With respect to the organic base, there may be mentioned by way of example without limiting the invention, arginine which is an aminoacid and its presence in the mixtures of aminoacids intended for use as described hereinabove is useful. Indeed, arginine is part of the Krebs-Henseleit cycle involved in the formation of urea, (A. Meister, "Biochemistry of the Amino Acids" 2nd Edit., Ac Press, N.Y. 1965, "Arginine, Ornithine and Citrulline; Urea Synthesis", pp. 685-707; J. S. Najaran, H. A. Harpey, Am. J. Med. 21, 832 (1956). By way of example, the addition of 5 meq of sodium hydroxide or 5 millimoles of arginine for every liter of eluate collected after the passage on the resin according to the procedure described hereinabove, permits to obtain after concentration under reduced pressure, a product in which ammonia is less than 0.02 grams per 100 grams of aminoacids and with a content of sodium of about 0.3 grams/100 grams of acidic aminoacids if sodium hydroxide is used or about 3 grams of arginine per 100 grams of aminoacids if arginine is used as the organic base.

TABLE 18

(Ex. 12)

|  | AA placed on the column in grams | AA recovered g | % of recovery g | % of a single AA in 100 g of mixture |
|---|---|---|---|---|
| Aspartic Acid | 190 | 48 | 25.3 | 2.6 |
| Threonine | 106 | 98 | 92.5 | 5.3 |
| Serine | 136 | 126 | 92.6 | 6.7 |
| Glutamic Acid | 670 | 215 | 32.1 | 11.5 |
| Proline | 337 | 327 | 97.0 | 17.5 |
| Glycine | 61 | 56 | 91.8 | 3.0 |
| Alanine | 105 | 102 | 97.1 | 5.5 |
| Valine | 193 | 177 | 91.7 | 9.5 |
| Methionine | 76 | 56 | 73.7 | 3.0 |
| Isoleucine | 124 | 114 | 91.9 | 6.1 |
| Leucine | 261 | 234 | 89.7 | 12.5 |
| Tyrosine | 6 | | | |
| Phenylalanine | 4 | | | |
| Lysine | 259 | 252 | 97.3 | 13.5 |
| Histidine | 72 | 58 | 80.6 | 3.1 |
| Arginine | 6 | 6 | 100.0 | 0.3 |

TABLE 18-continued (Ex. 12)

| | AA placed on the column in grams | AA recovered g | % of recovery g | % of a single AA in 100 g of mixture |
|---|---|---|---|---|
| Total | 2,606 | 1,869 | | |

EXAMPLE 13

From Example 12, it is possible to obtain a mixture of aminoacids with the following percentage composition after treatment on a IRA 400 column as shown in Table 19 hereinbelow.

TABLE 19

| | (ex. 13) | |
|---|---|---|
| Aspartic Acid | 2.55% | (2.2–2.8) |
| Threonine | 5.26% | (4.7–5.8) |
| Serine | 6.72% | (6.0–7.4) |
| Glutamic Acid | 11.50% | (10.3–12.7) |
| Proline | 17.50% | (15.7–19.3) |
| Glycine | 2.99% | (2.6–3.3) |
| Alanine | 5.48% | (4.9–6.1) |
| Valine | 9.49% | (8.5–10.5) |
| Methionine | 3.01% | (2.7–3.3) |
| Isoleucine | 6.11% | (5.4–6.7) |
| Leucine | 12.55% | (11.2–13.8) |
| Lysine | 13.49% | (12.1–14.8) |
| Histidine | 3.10% | (2.7–3.4) |
| Arginine | — | (0–8.3) |

The content of valine+isoleucine+leucine of this mixture is 28.15% with respect to the other aminoacids and is, therefore, suitable to constitute the basis to obtain mixtures having a high content of branched chain aminoacids according to the studies and the experiments reported in Examples 10 and 11. The economic advantage residing in the use of this mixture is analogous to what has already been reported under Example 9. By way of example, which is not intended to be limitative, when one add to 100 grams of the mixture described hereinabove, 3 grams of methionine, 6 grams of phenylalanine, 9 grams of arginine, and 1.8 grams of tryptophan, one obtains a re-elaborated mixture having the composition in aminoacids reported in Table 20 hereinbelow.

TABLE 20

| | (ex. 13) | |
|---|---|---|
| Aspartic Acid | 2.1% | (1.8–2.3) |
| Threonine | 4.4% | (3.9–4.9) |
| Serine | 5.6% | (5.0–6.2) |
| Glutamic Acid | 9.6% | (8.6–10.6) |
| Proline | 14.6% | (13.1–16.1) |
| Glycine | 2.5% | (2.2–2.8) |
| Alanine | 4.6% | (4.1–5.1) |
| Valine | 7.9% | (7.1–8.7) |
| Methionine | 5.0% | (4.5–5.5) |
| Isoleucine | 5.1% | (4.5–5.6) |
| Leucine | 10.5% | (9.4–11.6) |
| Phenylalanine | 5.0% | (4.5–5.5) |
| Lysine | 11.3% | (10.1–12.5) |
| Histidine | 2.6% | (2.3–2.9) |
| Arginine | 7.5% | (6.7–8.2) |
| Tryptophan | 1.5% | (1.3–1.6) |

The content of electrolytes in 100 grams of the elaborated mixture may be zero if in the preparation of the mixture, the quantity of arginine present is greater than 3% in percentage composition of the aminoacids or lower than 15 meq of cations per gram of aminoacids if arginine is not present in the mixture. The composition of the elaborated mixture in aminoacids, the content of branched chain aminoacids, which is 23.5% of the total aminoacids, the possible presence of small quantities of cations are perfectly suitable for the use of this formulation in all cases in which this type of formulation may cause improvements in the general conditions of patients and in particular, patients with trauma and sepsis. The table hereinbelow summarizes the fundamental parameters of this formulation.

TABLE 21

| | (Ex. 13) | | | | | |
|---|---|---|---|---|---|---|
| | % Composition after integration | (1) | (2) | (3) | (4) | (5) |
| Aspartic Acid | 2.1 | 0.221 | | | | |
| Threonine | 4.4 | 0.517 | 4.4 | | 307 | 87 |
| Serine | 5.6 | 0.746 | | | | |
| Glutamic Acid | 9.6 | 0.914 | | | | |
| Proline | 14.6 | 1.777 | | | | |
| Glycine | 2.5 | 0.466 | | | | |
| Alanine | 4.6 | 0.723 | | | | |
| Valine | 7.9 | 0.945 | 7.9 | 7.9 | 550 | 156 |
| Metionine | 5.0 | 0.469 | 5.0 | | 348 | 99 |
| Isoleucine | 5.1 | 0.545 | 5.1 | 5.1 | 355 | 101 |
| Leucine | 10.5 | 1.121 | 10.5 | 10.5 | 731 | 207 |
| Tyrosine | — | — | — | — | — | — |
| Phenylalanine | 5.0 | 0.424 | 5.0 | | 348 | 99 |
| Tryptophan | 1.5 | 0.206 | 1.5 | | 104 | 29 |
| Lysine | 11.3 | 2.165 | 11.3 | | 787 | 223 |
| Histidine | 2.6 | 0.704 | | | | |
| Arginine | 7.5 | 2.412 | | | | |
| | 14,355 | 50.7 | 23.5 | 3530 | | |

The symbols (1), (2), (3), (4), and (5) are the same as in Table 12.

EXAMPLE 14

On the basis of Example 12, it is possible to obtain a mixture of aminoacids with the following percent composition after treatment with an IRA 400 column.

TABLE 22

| | (Ex. 14) | |
|---|---|---|
| Aspartic Acid | 2.55% | (2.2–2.8) |
| Threonine | 5.26% | (4.7–5.8) |
| Serine | 6.72 | (6.0–7.4) |
| Glutamic Acid | 11.50 | (10.3–12.7) |
| Proline | 17.50 | (15.7–19.3) |
| Glycine | 2.99 | (2.6–3.3) |
| Alanine | 5.48 | (4.9–6.1) |
| Valine | 9.49 | (8.5–10.5) |
| Metionine | 3.01 | (2.7–3.3) |
| Isoleucine | 6.11 | (5.4–6.7) |
| Leucine | 12.55 | (11.2–13.8) |
| Lysine | 13.49 | (12.1–14.8) |
| Histidine | 3.10 | (2.7–3.4) |
| Arginine | — | (0–5.0) |

The same considerations reported in Example 13 apply to this formulation with respect to the content of branched chain aminoacids and economic convenience.

By way of example, without limiting the scope of the invention, when one gram of methionine, 0.8 grams of tyrosine, 3.4 grams of phenylalanine, 5 grams of arginine, and 1.9 grams of tryptophan are added to 100 grams of the mixture described hereinabove, the following composition of the re-elaborated mixture is obtained.

TABLE 23

| | (Ex. 14) | |
|---|---|---|
| Aspartic Acid | 2.3% | (2.0–2.5) |

TABLE 23-continued (Ex. 14)

| | | |
|---|---|---|
| Threonine | 4.7% | (4.2–5.2) |
| Serine | 6.0% | (5.4–6.6) |
| Glutamic Acid | 10.3% | (9.2–11.4) |
| Proline | 15.6% | (14.0–17.2) |
| Glycine | 2.7% | (2.4–3.0) |
| Alanine | 4.9% | (4.4–5.4) |
| Valine | 8.5% | (7.6–9.4) |
| Metionine | 3.6% | (3.2–4.0) |
| Isoleucine | 5.5% | (4.9–6.1) |
| Leucine | 11.2% | (10.0–12.3) |
| Tyrosine | 0.7% | (0.6–0.8) |
| Phenylalanine | 3.0% | (2.7–3.3) |
| Lysine | 12.0% | (10.8–13.2) |
| Histidine | 2.8% | (2.5–3.1) |
| Arginine | 4.5% | (4.0–5.0) |
| Tryptophan | 1.7% | (1.5–1.9) |

The content of electrolytes in 100 grams of the elaborated mixture may be zero when in the preparation of the basic mixture, the quantity of arginine is greater than 3% with respect to the percentage composition of aminoacids or less than 15 meq of cations per gram of aminoacids if in the final mixture, arginine is absent. The composition of the elaborated mixture, the content of branched chain aminoacids, that is 25.2%, the eventual presence of small quantities of cations are perfectly suitable for the utilization of this formulation in every case in which this type of formula is intended to improve the general condition of patients and particularly patients with tyrosine and sepsis. Table 24 summarizes the fundamental parameters of this formulation.

TABLE 24

(Ex. 14)

| | Comp. in % after integration | (1) | (2) | (3) | (4) | (5) |
|---|---|---|---|---|---|---|
| Aspartic Acid | 2.3 | 0.242 | | | | |
| Threonine | 4.7 | 0.552 | 4.7 | | 337 | 94 |
| Serine | 6.0 | 0.799 | | | | |
| Glutamic Acid | 10.3 | 0.981 | | | | |
| Proline | 15.6 | 1.899 | | | | |
| Glycine | 2.7 | 0.504 | | | | |
| Alanine | 4.9 | 0.770 | | | | |
| Valine | 8.5 | 1.017 | 8.5 | 8.5 | 610 | 169 |
| Methionine | 3.6 | 0.338 | 3.6 | | 258 | 72 |
| Isoleucine | 5.5 | 0.587 | 5.5 | 5.5 | 395 | 110 |
| Leucine | 11.2 | 1.196 | 11.2 | 11.2 | 804 | 223 |
| Tyrosine | 0.7 | 0.054 | | | | |
| Phenylalanine | 3.0 | 0.254 | 3.0 | | 215 | 60 |
| Tryptophan | 1.7 | 0.233 | 1.7 | | 122 | 34 |
| Lysine | 12.0 | 2.299 | 12.0 | | 861 | 239 |
| Histidine | 2.8 | 0.759 | | | | |
| Arginine | 4.5 | 1.447 | | | | |
| | | 13.931 | 50.2 | 25.2 | 3702 | |

The meanings of (1), (2), (3), (4), and (5) are the same as in Table 12.

EXAMPLE 15

The experimental conditions are identical to the conditions reported under Example 8 except in the concentration and composition of the aminoacids in the solution being fed, (see table 25). The quantity of aminoacids placed on the column is 1,271.3 grams and the content of aspartic acid and glutamic acid is 79.4 grams and 275.0 grams respectively.

As it is shown in table 25, in this example, the solution being fed, in spite of the fact that it is always prepared by purification of aminoacids derived from casein, contains tyrosine, phenylalanine, arginine, which are not present in the solutions used in the other examples because it is possible to eliminate these three aminoacids by different systems.

In Table 26 hereinbelow, the recovery and the balance with respect to the aminoacids placed on the column are reported. Under the experimental conditions used in Example 15, tyrosine and phenylalanine are completely adsorbed in the same manner as aspartic acid and glutamic acid, while arginine is eluted from the resin, together with the other aminoacids. In the same manner as described in Examples 9, 10, 11, 13, and 14, it is possible to obtain formulations suitable for use in parenteral and enteral nutrition.

TABLE 25

(Ex. 15)

| | g of AA/1 ammoniacal solution | g of AA/100 g of mixture of aminoacids |
|---|---|---|
| Aspartic Acid | 3.2 g | 6.24 |
| Threonine | 1.74 g | 3.39 |
| Serine | 2.06 g | 4.02 |
| Glutamic Acid | 11.09 g | 21.63 |
| Proline | 6.12 g | 11.94 |
| Glycine | 1.20 g | 2.34 |
| Alanine | 2.05 g | 4.00 |
| Valine | 3.66 g | 7.14 |
| Methionine | 1.46 g | 2.85 |
| Isoleucine | 2.67 g | 5.21 |
| Leucine | 5.22 g | 10.18 |
| Tyrosine | 1.5 g | 2.93 |
| Phenylalanine | 1.5 g | 2.93 |
| Lysine | 5.03 g | 9.81 |
| Histidine | 1.51 g | 2.95 |
| Arginine | 1.25 g | 2.44 |
| Total aminoacids | 51.26 g | |

TABLE 26

(Ex. 15)

| | AA placed on the column in grams | AA recovered in grams | % of recovery | % of each AA in 100 grams of mixture |
|---|---|---|---|---|
| Aspartic Acid | 79.4 | 0 | 0 | — |
| Threonine | 43.2 | 41.6 | 96.2 | 5.6 |
| Serine | 51.1 | 48.8 | 95.5 | 6.5 |
| Glutamic Acid | 275.0 | 0 | 0 | — |
| Proline | 151.8 | 144.2 | 95.0 | 19.4 |
| Glycine | 29.8 | 28.5 | 95.7 | 3.8 |
| Alanine | 50.8 | 50.4 | 99.2 | 6.8 |
| Valine | 90.8 | 81.7 | 90.0 | 11.0 |
| Methionine | 36.2 | 20.5 | 56.5 | 2.7 |
| Isoleucine | 66.2 | 49.8 | 75.2 | 6.7 |
| Leucine | 129.5 | 96.9 | 74.8 | 13.0 |
| Tyrosine | 37.2 | 0 | 0 | — |
| Phenylalanine | 37.2 | 0 | 0 | — |
| Lysine | 124.7 | 123.8 | 99.3 | 16.6 |
| Histidine | 37.4 | 27.7 | 74 | 3.7 |
| Arginine | 31.0 | 30.7 | 99.0 | 4.1 |
| Total | 1271.3 | 744.6 | | |

EXAMPLE 16

The column, the type of resin and the ionic form are identical to those reported under Example 1. The rate of percolation is maintained at 1 volume of solution/hour/volume of resin. The solution being fed consists of a mixture of aminoacids in the proportions reported in Table 27, obtained by hydrolysis of soya flour after suitable treatments for the purification.

TABLE 27

(Ex. 16)

| | g of AA/1 ammoniacal solution | g of AA/100 g of mixture of aminoacids |
|---|---|---|
| Aspartic Acid | 5.25 g | 13.8 |
| Threonine | 1.43 g | 3.76 |
| Serine | 2.15 g | 5.65 |
| Glutamic Acid | 9.31 g | 24.48 |
| Proline | 2.75 g | 7.23 |
| Glycine | 2.35 g | 6.1 |
| Alanine | 2.73 g | 7.81 |
| Valine | 2.51 g | 6.6 |
| Methionine | 0.38 g | 0.99 |
| Isoleucine | 1.76 g | 4.63 |
| Leucine | 3.12 g | 8.2 |
| Tyrosine | — g | — |
| Phenylalanine | — g | — |
| Lysine | 3.51 g | 9.23 |
| Histidine | 0.77 g | 2.02 |
| Arginine | — g | — |
| Total aminoacids | 38.02 g | |

The ammoniacal solution is passed through the column over a period of 120 minutes. The quantity of aminoacids placed on the column is 836.44 grams and the content of aspartic acid and glutamic acid is 115.4 and 204.7 grams respectively. At the end of the initial phase, the elution phase is started, utilizing a dilute solution of ammonia/ammonium chloride buffer, that is Buffer A.

The elution phase lasts 240 minutes corresponding to 44 liters of ammoniacal solution of ammonium chloride being passed through the column. The entire eluate is collected. Table 28 hereinbelow shows the recovery and the balance with respect to the aminoacids being placed on the column. The recovery of the aminoacids after elution is 460.2 grams and the theoretical recovery, calculated by subtracting the quantity of aspartic acid and glutamic acid from the total quantity of the aminoacids placed on the column, is 516.14 grams. This corresponds to a yield of 89.2%. The chlorine content in the final mixture, devoid of aspartic acid and glutamic acid is 0.7%.

In a manner similar to Examples 9, 10, 11, 13, and 14 reported hereinabove, there may be obtained formulations suitable for use in clinical nutrition or in zootechnical or veterinary use by suitable addition of aminoacids lacking in the intermediate formulation.

TABLE 28

(Ex. 16)

| | AA placed on the column in grams | AA recovered in grams | % of recovery | % of each AA in 100 grams of mixture |
|---|---|---|---|---|
| Aspartic Acid | 115.5 | 0 | 0 | — |
| Threonine | 31.5 | 31.1 | 98.7 | 6.75 |
| Serine | 47.3 | 42 | 88.8 | 9.13 |
| Glutamic Acid | 204.8 | 0 | 0 | — |
| Proline | 60.5 | 55 | 90.9 | 11.95 |
| Glycine | 51.7 | 49.2 | 95.1 | 10.7 |
| Alanine | 60.1 | 58.6 | 97.5 | 12.7 |
| Valine | 55.2 | 50.3 | 91.1 | 10.9 |
| Methionine | 8.3 | 3.6 | 43.3 | 0.78 |
| Isoleucine | 38.72 | 31.2 | 80.6 | 6.78 |
| Leucine | 68.6 | 52.3 | 76.2 | 11.4 |
| Tyrosine | — | — | — | — |
| Phenylalanine | — | — | — | — |
| Lysine | 77.2 | 76.5 | 99.1 | 16.6 |
| Histidine | 16.9 | 10.4 | 61.5 | 2.26 |
| Arginine | — | — | — | — |
| Total | 836.44 | 460.2 | | |

EXAMPLE 17

The column is operated under the same conditions as described in the preceding examples. The aminoacid mixture is placed on the column by using a solution of concentration and composition as reported in Table 29 hereinbelow.

TABLE 29

(ex. 17)

| | g of AA/1 ammoniacal solution | g of AA/100 g of mixture of aminoacids |
|---|---|---|
| Aspartic Acid | 3.15 g | 8.34 |
| Threonine | 1.47 g | 3.89 |
| Serine | 1.33 g | 3.52 |
| Glutamic Acid | 6.12 g | 16.2 |
| Proline | 2.71 g | 7.17 |
| Glycine | 3.56 g | 9.43 |
| Alanine | 3.40 g | 9.00 |
| Valine | 2.72 g | 7.2 |
| Methionine | 1.46 g | 3.86 |
| Isoleucine | 1.76 g | 4.66 |
| Leucine | 3.88 g | 10.27 |
| Tyrosine | — | — |
| Phenylalanine | — | — |
| Lysine | 5.43 g | 14.3 |
| Histidine | 0.77 g | 2.04 |
| Arginine | — | — |
| Total aminoacids | 37.76 g | |

The mixture of aminoacids is obtained by hydrolysis of fish flour after suitable treatments for the purification and decoloration.

The quantity of aminoacids placed on the column is 883.6 grams and the aspartic acid and glutamic acid content is 73.7 grams and 143.2 grams, respectively.

The rate of percolation is increased to 1.74 volumes of solution/hour/volume of resin. During the phase when the aminoacids are placed on the column, the solution which goes through the column and is removed from the column, contains no aminoacids.

The elution is carried out with an ammoniacal solution of ammonium chloride, that is Buffer A. The elution phase lasts 140 minutes, corresponding to about 44.6 liters of an ammoniacal solution of ammonium chloride. The entire eluate is collected.

Table 30 hereinbelow summarizes the recovery and the balance with respect to the aminoacids placed on the column. The recovery of the aminoacids after elution is 585 grams. The theoretical recovery is 666.7 grams, calculated by subtracting aspartic acid and glutamic acid from the total quantity of aminoacids placed on the column. This corresponds to a yield of 87.7%. The chloride content in the final mixture, devoid of aspartic acid and glutamic acid, is 1.4%.

In the same manner as Examples 9, 10, 11, 13, and 14 reported hereinabove, there may be obtained formulations suitable for zootechnical use, veterinary use and in clinical nutrition by appropriate additions of aminoacids, which are lacking in the intermediate formulation.

TABLE 30

(Ex. 17)

| | AA placed on the column in grams | AA recovered in grams | % of recovery | % of each AA in 100 grams of mixture |
|---|---|---|---|---|
| Aspartic Acid | 73.7 | 0 | 0 | — |
| Threonine | 34.4 | 32.2 | 93.6 | 5.5 |
| Serine | 31.1 | 28.3 | 90.9 | 4.83 |

TABLE 30-continued
(Ex. 17)

|  | AA placed on the column in grams | AA recovered in grams | % of recovery | % of each AA in 100 grams of mixture |
|---|---|---|---|---|
| Glutamic Acid | 143.2 | 0 | 0 | — |
| Proline | 63.4 | 55.1 | 86.9 | 9.41 |
| Glycine | 83.3 | 80.2 | 96.2 | 13.7 |
| Alanine | 79.6 | 77.3 | 97.1 | 13.2 |
| Valine | 63.6 | 56 | 88 | 9.57 |
| Methionine | 34.2 | 15.9 | 46.5 | 2.72 |
| Isoleucine | 41.2 | 32.4 | 78.6 | 5.54 |
| Leucine | 90.8 | 69.9 | 76.9 | 11.9 |
| Tyrosine | — | — | — | — |
| Phenylalanine | — | — | — | — |
| Lysine | 127.1 | 125.8 | 98.9 | 21.5 |
| Histidine | 18.0 | 11.9 | 66.1 | 2.03 |
| Arginine | — | — | — | — |
| Total | 883.6 | 585.0 | | |

EXAMPLE 18

The column is operated under the identical conditions used in the preceding examples. The rate of percolation is 1.74 volumes of solution/hour/per volume of resin. The quantity of aminoacids placed on the column is 871.0 grams and the content of aspartic acid and glutamic acid is 107.6 grams and 147.2 grams, respectively. The data of concentration and percentage composition of the solution being fed during the feeding phase are reported in Table 31 hereinbelow. The solution being used for the elution is Buffer C. The phase of elution with the ammoniacal solution of ammonium acetate lasts 195 minutes, corresponding to about 60 liters of ammoniacal solution of ammonium acetate.

Table 32 shows the recovery and the balance with respect to the aminoacids placed on the column. The composition reported in Table 31 is derived from the complete hydrolysis and subsequent purification of egg albumen. In the same manner as in the examples reported hereinabove, 9, 10, 11, 13, and 14, there may be obtained formulations suitable for clinical nutrition.

TABLE 31
(Ex. 18)

|  | g of AA/1 ammoniacal solution | g of AA/100 g of mixture of aminoacids |
|---|---|---|
| Aspartic Acid | 4.60 g | 12.36 |
| Threonine | 1.87 g | 5.02 |
| Serine | 2.69 g | 7.23 |
| Glutamic Acid | 6.29 g | 16.90 |
| Proline | 1.69 g | 4.54 |
| Glycine | 1.78 g | 4.78 |
| Alanine | 3.06 g | 8.22 |
| Valine | 2.83 g | 7.60 |
| Methionine | 1.87 g | 5.02 |
| Isoleucine | 2.28 g | 6.13 |
| Leucine | 3.83 g | 10.29 |
| Tyrosine | — g | — |
| Phenylalanine | — g | — |
| Lysine | 3.29 g | 8.84 |
| Histidine | 1.14 g | 3.06 |
| Arginine | — g | — |
| Total aminoacids | 37.22 g | |

TABLE 32
(Ex. 18)

|  | AA placed on the column in grams | AA recovered in grams | % of recovery | % of each AA in 100 grams of mixture |
|---|---|---|---|---|
| Aspartic Acid | 107.6 | 0 | 0 | — |
| Threonine | 43.8 | 42.1 | 96.1 | 7.8 |
| Serine | 62.9 | 59.6 | 94.8 | 11.0 |
| Glutamic Acid | 147.2 | 0 | 0 | — |
| Proline | 39.5 | 37.7 | 95.5 | 6.9 |
| Glycine | 41.7 | 40.0 | 95.9 | 7.4 |
| Alanine | 71.6 | 71.0 | 99.1 | 13.1 |
| Valine | 66.2 | 60.9 | 92.0 | 11.2 |
| Methionine | 43.8 | 23.8 | 54.3 | 4.4 |
| Isoleucine | 53.4 | 41.6 | 77.9 | 7.7 |
| Leucine | 89.6 | 69.7 | 77.8 | 12.8 |
| Tyrosine | — | — | — | — |
| Phenylalanine | — | — | — | — |
| Lysine | 77.0 | 76.6 | 99.5 | 14.1 |
| Histidine | 26.7 | 19.6 | 73.4 | 3.6 |
| Arginine | — | — | — | — |
| Total | 871.0 | 542.6 | | |

EXAMPLE 19

The column is operated under conditions identical to the previous examples. The ammoniacal solution of the aminoacids is placed on the column with a concentration and a composition reported hereinbelow.

TABLE 33
(Ex. 19)

|  | g of AA/1 ammoniacal solution | g of AA/100 g of mixture of aminoacids |
|---|---|---|
| Aspartic Acid | 5.56 | 13.9 |
| Threonine | 2.44 | 6.1 |
| Serine | 1.96 | 4.9 |
| Glutamic Acid | 5.52 | 13.8 |
| Proline | 2.76 | 6.9 |
| Glycine | 2.68 | 6.7 |
| Alanine | 2.88 | 7.2 |
| Valine | 3.32 | 8.3 |
| Methionine | 1.12 | 2.8 |
| Isoleucine | 2.28 | 5.7 |
| Leucine | 4.08 | 10.2 |
| Tyrosine | 0.04 | 0.1 |
| Phenylalanine | 0.04 | 0.1 |
| Lysine | 4.32 | 10.8 |
| Histidine | 0.92 | 2.3 |
| Arginine | 0.08 | 0.2 |
| Total aminoacids | 40.00 | |

The mixture of aminoacids is obtained by hydrolysis of a protein concentrate from potatoes after conventional treatments for purification and decoloration. The values reported in Table 33 are given by way of illustration, are not intended to limit the scope of the invention and may vary within ranges, which still permit to identify the source of the original protein.

The rate of percolation, the period of time during the stage of passing the solution through the column, the period of time for processing and for the elution are similar to Example 8.

Table 34 hereinbelow reports the recovery and the balance with respect to the aminoacids placed on the column. In the same manner as the examples previously reported, it is possible to obtain formulations suitable in clinical nutrition or for other uses by appropriate additions of other aminoacids such as arginine, tryptophan, phenylananine, and tyrosine.

TABLE 34
(Ex. 19)

|  | AA placed on the column in grams | AA recovered in grams | % recovered | % of each AA in 100 grams of mixture |
|---|---|---|---|---|
| Aspartic Acid | 139 | 0 | | |
| Threonine | 61 | 56.7 | 93.0 | 8.9 |
| Serine | 49 | 45.6 | 93.0 | 7.2 |
| Glutamic Acid | 138 | 0 | 0 | |
| Proline | 69 | 63.5 | 92.0 | 10.0 |
| Glycine | 67 | 64.2 | 95.8 | 10.1 |
| Alanine | 72 | 69.2 | 96.1 | 10.9 |
| Valine | 83 | 74.8 | 90.1 | 11.7 |
| Methionine | 28 | 15.4 | 54.9 | 2.4 |
| Isoleucine | 57 | 44.6 | 78.2 | 7.0 |
| Leucine | 102 | 78.6 | 77.1 | 12.3 |
| Tyrosine | 1 | | | |
| Phenylalanine | 1 | | | |
| Lysine | 108 | 107 | 99.0 | 16.7 |
| Histidine | 23 | 16.1 | 70.1 | 2.5 |
| Arginine | 2 | 1.9 | 95.0 | 0.3 |
| Total | 1000 | 637.6 | | |

EXAMPLE 20

The processing conditions are identical to Example 12, but are not intended to be limitative. An ammoniacal solution of aminoacids of concentration and composition identical to Example 19 is placed on the column. The mixture of aminoacids is obtained by hydrolysis of a protein concentrate derived from potatoes after the usual treatments for purification and decoloration. The values reported in Table 35 are given by way of illustration, are not intended to limit the scope of the invention and may vary within ranges which still permit the identification of the protein starting material.

The rate of percolation, the period of time required for passing the solution, processing time and elution are similar to Example 12.

Table 35 summarizes the recovery and the balance with respect to the aminoacids placed on the column. In the same manner as in the preceding examples, it is possible to obtain formulations suitable for clinical nutrition or other uses by suitable additions of other aminoacids such as arginine, tyrosine, phenylalanine, and tryptophan.

TABLE 35
(Ex. 20)

|  | AA placed on the column in grams | AA recovered in grams | % recovery | % of each AA in 100 grams of mixture |
|---|---|---|---|---|
| Aspartic Acid | 417 | 108.8 | 26.1 | 4.8 |
| Threonine | 183 | 170.7 | 93.0 | 7.5 |
| Serine | 147 | 162.0 | 93.1 | 7.1 |
| Glutamic Acid | 414 | 137.4 | 33.2 | 6.0 |
| Proline | 207 | 202.8 | 98.0 | 8.9 |
| Glycine | 201 | 185.0 | 92.1 | 8.1 |
| Alanine | 216 | 209.7 | 97.1 | 9.2 |
| Valine | 249 | 228.8 | 91.9 | 10.1 |
| Methionine | 84 | 61.1 | 72.8 | 2.7 |
| Isoleucine | 171 | 159 | 93.0 | 7.0 |
| Leucine | 306 | 281.8 | 92.1 | 12.3 |
| Tyrosine | 0.3 | | | |
| Phenylalanine | 0.3 | | | |
| Lysine | 324 | 314.3 | 97.0 | 13.8 |
| Histidine | 69 | 54.5 | 79.1 | 2.4 |
| Arginine | 6 | 6 | 100.0 | 0.03 |
| Total | 3000 | 2282.5 | | |

What is claimed is:

1. A process for the total or partial elimination of aspartic acid and glutamic acid from a protein hydrolyzate or a mixture of aminoacids, which contains aspartic acid and glutamic acid, which comprises passing said hydrolyzate or said mixture of aminoacids in an ammoniacal solution or a pH not less than 7 on a strong anion exchange resin and then eluting the aminoacids from the resin with an ammoniacal solution of pH not less than 7 whereby aspartic acid and glutamic acid are at least partially separated from the other aminoacid mixture because of their affinity for the resin which is greater than the affinity of the other aminoacids.

2. The process according to claim 1, wherein the eluate or the aqueous solution removed from the column is concentrated by evaporation to yield a suspension or a dry residue.

3. The process according to claim 1, wherein said aminoacid mixture is obtained by hydrolysis of a protein of animal or vegetable origin.

4. The process according to claim 3, wherein the protein is casein.

5. The process according to claim 4 wherein said protein hydrolyzate is a hydrolyzate of casein, and said hydrolyzate yields a mixture of Threonine 6.5%
Serine 8.3%
Proline 22.3%
Glycine 3.8%
Alanine 7.0%
Valine 10.9%
Methionine 2.2%
Isoleucine 6.2%
Leucine 13.2%
Lysine 17.2%
Histidine 2.4% with a total content of valine, isoleucine and leucine of 30.3%.

6. The process according to claim 3, wherein the protein is fish flour, soya flour, blood flour, feathers, gelatin, bovine hide, torula, protein residue of hepatic extract, albumen, extracts of organs, protein-containing products derived from the isolation of enrichment of the protein portion in the treatment of material of animal and vegetable origin, protein concentrates from potatoes, gluten from corn, or milk serum.

7. The process according to claim 3, wherein the protein is a by-product of industrial or agricultural origin.

8. The process according to claim 3, wherein the mixture of aminoacids is obtained by an industrial fermentation process.

9. The process according to claim 1, wherein said solution used for the elution is a buffer of ammonia and ammonium chloride.

10. The process according to claim 1, wherein said solution used for the elution is a buffer of ammonia and ammonium acetate.

11. The process according to claim 1 wherein the aminoacids mixture after said total or partial elimination of aspartic and glutamic acid is a mixture of L-aminoacids.

12. The process according to claim 1 wherein said hydrolysate or said mixture of aminoacids is dissolved in a dilute ammonia solution of pH 10.

* * * * *